(12) United States Patent
Outoukian (10) Patent No.: US 11,377,015 B2
(45) Date of Patent: Jul. 5, 2022

(54) DETACHABLE MOTORIZED VEHICLE

(71) Applicant: Sarhat Outoukian, Shanghai (CN)

(72) Inventor: Sarhat Outoukian, Shanghai (CN)

( * ) Notice: Subject to any disclaimer, the term of this patent is extended or adjusted under 35 U.S.C. 154(b) by 1051 days.

(21) Appl. No.: 16/013,912

(22) Filed: Jun. 20, 2018

(65) Prior Publication Data
US 2019/0135158 A1 May 9, 2019

Related U.S. Application Data

(63) Continuation of application No. 15/803,716, filed on Nov. 3, 2017, now abandoned.

(51) Int. Cl.
*B60P 3/07* (2006.01)
*B60L 53/14* (2019.01)
*B60L 53/30* (2019.01)
*B60P 1/43* (2006.01)

(52) U.S. Cl.
CPC ............ *B60P 3/07* (2013.01); *B60L 53/14* (2019.02); *B60L 53/30* (2019.02); *B60L 2200/24* (2013.01); *B60P 1/435* (2013.01)

(58) Field of Classification Search
CPC .... B60P 3/07; B60L 2200/24; B60L 11/1824; B60L 1/1816
USPC ........................................................ 320/109
See application file for complete search history.

(56) References Cited

U.S. PATENT DOCUMENTS

| | | | | |
|---|---|---|---|---|
| 6,692,215 B1* | 2/2004 | Panzarella et al. | ..... | B60P 3/122 414/921 |
| 8,540,214 B2* | 9/2013 | Christian | ................ | B60P 3/122 254/133 R |
| 9,597,240 B2* | 3/2017 | Hermanson et al. | ... | B60P 1/435 |
| 2010/0228405 A1* | 9/2010 | Morgal | ................... | B60L 50/20 701/1 |
| 2014/0353949 A1* | 12/2014 | Sugimori | ............ | B60R 21/2338 280/728.2 |

* cited by examiner

*Primary Examiner* — Sun J Lin (57) ABSTRACT

A system and method for transporting a detachable vehicle is provided. In one embodiment of the present invention, a track is affixed to a first vehicle, such as a van, and used to transport (e.g., load, secure, unload, etc.) a detachable vehicle, such as a motorized scooter. The track may be a single track, or a plurality of track portions (e.g., a ramp portion, a floor portion, a seat portion, etc.). In one embodiment of the present invention, the first vehicle includes a first connector and the detachable vehicle includes a second connector, where said first connector and said second connector can be mated, either manually or automatically in response to moving the detachable vehicle along the track (e.g., to a final location). Once an electrical connection is made, said electrical connection can be used to share information between the vehicles and/or to charge a battery on the detachable vehicle.

20 Claims, 12 Drawing Sheets

DETACHABLE MOTORIZED VEHICLE

BACKGROUND OF THE INVENTION

1. Field of the Invention

The present invention relates to a detachable motorized vehicle, or more particularly to the use of a first (e.g., larger) vehicle (e.g., van, truck, car, etc.) to transport a detachable (e.g., smaller) vehicle (e.g., scooter, car, etc.), where the first vehicle is configured to receive and/or secure the detachable vehicle, and/or the detachable vehicle is configured to be loaded into, secured by, and/or electrically connected to the first vehicle. The electrical connection therebetween can be used to communicate information to the first vehicle (e.g., diagnostics, etc.), communicate information to the detachable vehicle (e.g., driving directions, etc.), and/or provide power to (e.g., charge, etc.) the detachable vehicle.

2. Description of Related Art

There are times when it may be desirable to bring more than one vehicle to a particular location. For example, while vacationing, it may be desirable to bring both an all-terrain vehicle (ATV) and a recreational vehicle (RV). While camping, it may be desirable to bring both a mountain bike and a sports utility vehicle (SUV). While working, it may be desirable to bring both a motorized scooter (e.g., moped, motorcycle, etc.) and a van. For example, one may use the van to travel from one city to another (e.g., long distances, open areas, etc.), park the van on the outskirts of the city, and use the scooter to travel within the city to one's destination (e.g., short distances, compact areas, etc.), thereby reducing traffic time, avoiding expensive parking fees, etc. However, doing so may be difficult, if not impossible. At the very least, it may require the use of specialized, after-market equipment, such as an external rack, a trailer, etc.

There are drawbacks, however, with traditional ways of transporting more than one vehicle. The first one is cost. It can be very expensive to purchase and operate the equipment need to transport a second vehicle. For example, a trailer is not only expensive to purchase, but has various expenses associated with its operation (e.g., licensing, maintenance, etc.). A second drawback is ease of use. For example, a rack must be stored separately when it is not being used, and when it is being used, it requires a substantial amount of time to assemble and install.

Another drawback is functionality, or lack thereof. While traditional devices allow a user to secure a second, smaller vehicle to a first, larger vehicle, that is generally the extent of their functionality. This leaves much to be desired in today's technological environment, where vehicles are switching from traditional gasoline power engines to battery powered engines, and cell phones are being used to do everything from acquiring driving directions to operating remote fixtures (e.g., lights, appliances, etc.).

Thus, it would be advantageous to develop a system that overcame as least some of the foregoing drawbacks. For example, it would be beneficial if the system not only simplified the physical aspects of transporting a second, detachable vehicle (e.g., simplifying the loading, securing, and unloading process), but added features that are not available on traditional devices. Features such as using the first vehicle's power system to charge the second vehicle, communicating information regarding the second vehicle (diagnostics, etc.) to the first vehicle, communicating information (e.g., maps, driving directions, music, etc.) from the first vehicle to the second vehicle, using a wireless device (e.g., smartphone, etc.) to monitor and/or control aspects of the first and/or second vehicle, etc.

SUMMARY OF THE INVENTION

The present invention provides a system and method for transporting a detachable vehicle, where the detachable vehicle is disposed inside another, larger vehicle. Preferred embodiments of the present invention include a first (preferably larger) vehicle, a detachable (preferably smaller) vehicle, and a system for physically and/or electrically connecting the same.

In one embodiment of the present invention, a track is affixed to a first vehicle, such as a van, and used to transport (e.g., load, secure, unload, etc.) a detachable vehicle, such as a motorized scooter. The track may include a channel having a width that is substantially the same as that of a tire on the detachable vehicle. In one embodiment, the track is used to guide the detachable vehicle from a first location to at least a second location within the first vehicle. The channel in the track may also be used to secure the detachable vehicle, or prevent the detachable vehicle from moving side to side while it is being transported.

There are two primary embodiments of the present invention, where the first embodiment involves loading the detachable vehicle from the rear of the first vehicle, and the second embodiment involves loading the detachable vehicle from the side of the first vehicle. In both embodiments, the first vehicle includes at least one door and at least one ramp, and the track includes a first track portion that is mounted to a floor (or lower horizontal surface) of the first vehicle and a second (or third) track portion that is mounted to the ramp. This allows the detachable vehicle to be loaded onto the first vehicle from either behind or the side (depending on the embodiment) via the plurality of track portions.

If the first vehicle is a cargo van or a truck, then a single track portion inside the first vehicle may suffice. However, if the first vehicle is a passenger van or car, with additional seating, then additional track portions may be required in order to place the detachable vehicle completely inside the first vehicle. By way of example, the first vehicle may include a first track portion mounted to a floor (or lower horizontal surface) of the first vehicle and a fourth track portion mounted to a back of a seat, where the seat is movable from a first (upright) position to a second (folded) position.

If the detachable vehicle is encroaching on space where passengers may be seated (e.g., to the left or right of the folded seat), then additional structure (e.g., a partial enclosure, etc.) may be necessary to prevent the passengers from coming into contact with the detachable vehicle. For example, a shell (or hood) may further be attached to the back of the seat. The shell may be configured to at least shield passenger seated to the left of the folded seat, to the right of the folded seat, and in front of the folded seat. If the enclosure is designed properly, it can also provide support for the detachable vehicle (e.g., maintaining the detachable vehicle upright).

In one embodiment of the present invention, the enclosure may further include a first connector, where a second (mating) connector is included on the detachable vehicle. The connectors (or pins/sockets included therein) can be used to transfer power and/or information (e.g., commands, data, etc.) between the first and detachable vehicles. In an alternate embodiment of the present invention, the first connector is affixed to the track, and the second connector is affixed to a bottom (undercarriage) of the detachable vehicle. In either embodiment, the connectors can either be configured mated manually or automatically (e.g., when the detachable vehicle is moved along the track).

In another embodiment of the present invention, the track may also include structures for securing the detachable vehicle during transport. For example, vertical structures can be positioned to engage the axles and/or tires of the detachable vehicle to prevent (or at least limit) vehicle movement along the track during transport. Thus, while the present invention is not limited to any particular structure, by using the support structures disclosed herein, the track may prevent side to side movement, the vertical structures may prevent back and forth movement, and the enclosure may keep the vehicle upright (e.g., similar to a bicycle rack).

In certain embodiment of the present invention, it may be advantageous to fold or arrange the detachable vehicle to fit within the first vehicle. For example, a first hinge could be used to fold the vehicle in half, resulting in the front wheel being positioned over (or near) the rear wheel. Further, a second hinge (or pivot) could be used to pivot the handlebar downward, toward the frame. Those skilled in the art will understand that use of the first hinge will reduce the overall length of the vehicle, while use of the second hinge will reduce the overall height of the vehicle.

By way of another example, a pivot could be used to swivel the handlebars from a first position (i.e., perpendicular to the frame) to a second position (e.g., parallel to the frame, or at least not-perpendicular to the frame). Further, third and fourth hinges could be used to fold the grips inward (e.g., perpendicular to the handlebar, to lay flat against the handlebar, etc.). Those skilled in the art will understand that the pivot and the third and fourth hinges will reduce the overall width of the vehicle.

As discussed above, by forming an electrical connection between the first and detachable vehicle, power and/or information (e.g., commands, data, etc.) can be transferred therebetween. For example, if the first vehicle has at least one battery and/or at least one charging mechanism (e.g., an alternator), these features can be used to charge a battery on the detachable vehicle while the detachable vehicle is being transported. In other words, not only is the first vehicle being used to transport the detachable vehicle, but it is also being used to charge the detachable vehicle. By way of another example, a processor and at least one sensor in the detachable vehicle can be used to transmit sensed information to the first vehicle. This can includes diagnosis data, such as tire pressure, battery level (e.g., charge percentage, miles to empty, etc.), status of each light (e.g., headlight, brake light, turning signals, etc.), etc. The diagnosis data can then be displayed to the user via a display and/or acted on by a processor in the first vehicle (e.g., stop charging the detachable vehicle if the battery is fully charged, etc.).

Finally, while the electrical connection between the vehicles may allow the vehicles to exchange power and/or information, wireless transmitters, receivers, and transceivers can further be used to exchange information when the vehicles are not electrically connected, and/or to communicate with other electronic devices (e.g., a key FOB, a smartphone, etc.).

A more complete understanding of a system and method for transporting a motorized, detachable vehicle will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

Preferred embodiments of the present invention include a first (preferably larger) vehicle, a detachable (preferably smaller) vehicle, and a system for physically and/or electrically connecting the same. It should be appreciated that while the present invention is described in terms of a van being used to transport a detachable, motorized scooter, the present invention is not so limited, and can be used with any first vehicle (e.g., RV, SUV, minivan, car, airplane, boat, etc.) to transport any second vehicle (e.g., car, moped, motorcycle, AN, mountain bike, jet ski, etc.), regardless of size, travel medium (road, water, air, etc.), or method of propulsion (e.g., battery powered, gasoline powered, human powered, etc.).

Figure 1A:
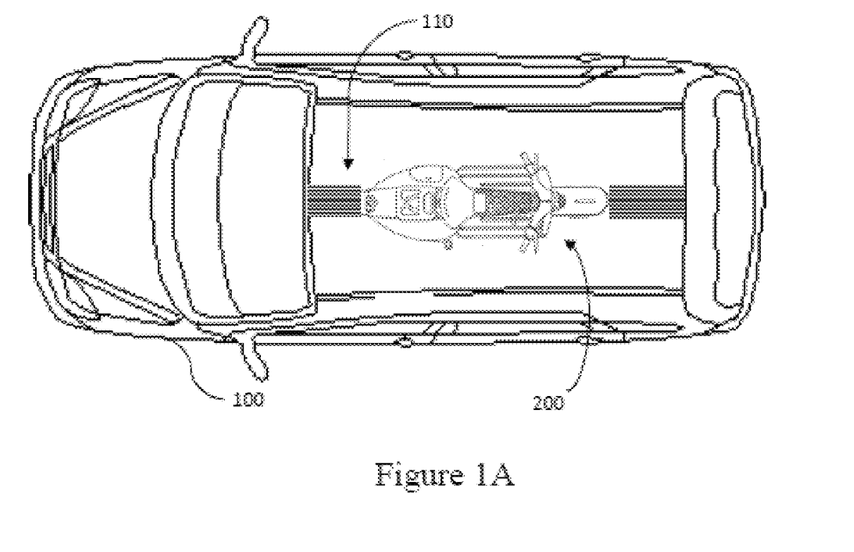
FIG. 1A illustrates how a track can be mounted within a larger vehicle and used to transport and/or secure a smaller, detachable vehicle in accordance with one embodiment of the present invention.

In one embodiment of the present invention, as shown in FIG. 1, a track 110 is affixed to a first vehicle 100, such as a van, and used to transport (e.g., load, secure, unload, etc.) a second, detachable vehicle 200, such as a motorized scooter. It should be appreciated, as discussed in greater detail below, that the present invention is not limited to use of a track, or use of any particular track, mounted in any particular orientation. For example, the track (or a portion thereof) could be affixed to a lower, horizontal surface, such as a floor of the first vehicle, a trunk (or cargo) bottom of the first vehicle, etc., and/or could be affixed to a vertical surface, such as an interior wall of the first vehicle, a seat back of the first vehicle, a door of the first vehicle, etc. By way of another example, the track (or a portion thereof) could be oriented in parallel with the first vehicle's direction of travel (i.e., front to back), perpendicular to the first vehicle's direction of travel (i.e., side to side), or otherwise.

Figure 1B:
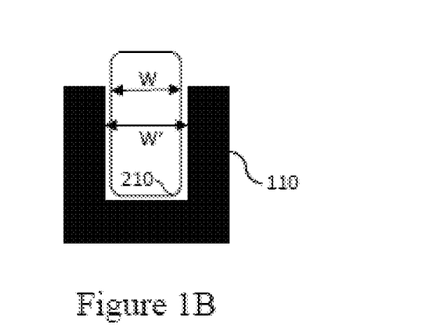
FIG. 1B provides a cross-sectional view of the track depicted in FIG. 1A.

A cross-section of an exemplary track is shown in FIG. 2. In one embodiment of the present invention, the track 110 is u-shaped, or includes a channel having a width (W'). If the width of the track (W') is substantially the same as (e.g., equal to, slightly larger than, etc.) the width of a tire (W) on the second vehicle 200, then the track can be used to guide the second vehicle from a first location (e.g., an entry point, an early location along the track, etc.) to a second location (e.g., an end point, a location further along the track, etc.). If it is designed correctly (e.g., of substantially height, having tight tolerances, etc.), it can also be used to secure (at least partially) the second vehicle. It should be appreciated that, to the extent a track is used, the present invention is not limited to the track (or type of track) shown in FIG. 2, and may vary depending on the type of vehicle being secured. For example, if the vehicle does not have wheels, then the track may include at least one rotational device (e.g., casters, etc.) for moving the vehicle along the track. By way of another example, if the track is configured to accommodate wheels having various widths, then the track may be substantially flat, or include a channel having an adjustable width (e.g., where one vertical member can be ratcheted closer to or further apart from the other vertical member, etc.).

There are two primary embodiments of the present invention, where the first embodiment involves loading the second vehicle from the rear of the first vehicle, and the second embodiment involves loading the second vehicle from the side of the first vehicle. These embodiments will now be discussed, with the understanding that the present invention is not limited to either one of these embodiments, and may involve other methods of transporting the second vehicle (e.g., mounting the second vehicle to an outer surface of the first vehicle, etc.).

Figure 2A:
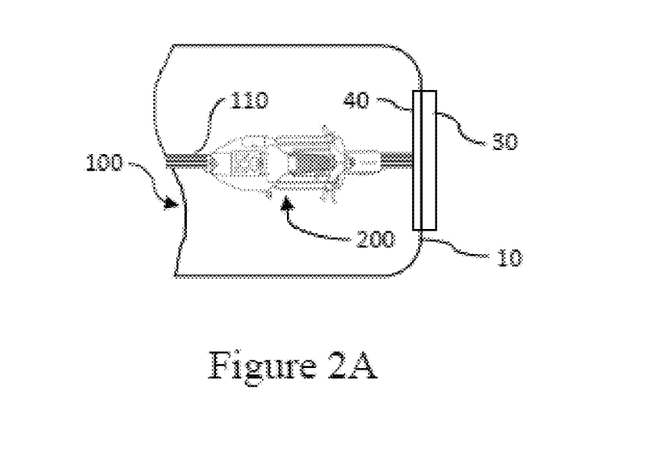
FIGS. 2A and B illustrate how the larger vehicle can be configured to receive, secure, and/or transport the smaller, detachable vehicle in accordance with a first embodiment of the present invention.
Figure 2B:
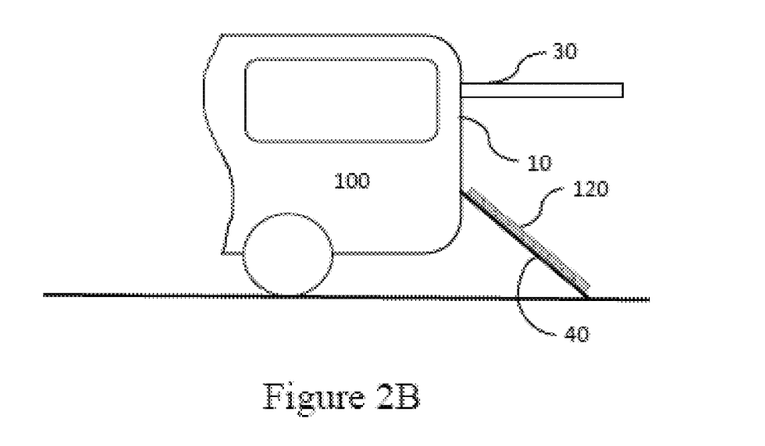

In the first embodiment of the present invention, as shown in FIGS. 2A and B, the first vehicle 100 includes at least one door 30 and at least one ramp 40, and the track includes a first track portion 110 that is mounted to a floor (or lower horizontal surface) of the first vehicle and a second track portion 120 that is mounted to the ramp 40. This allows the second vehicle 200 to be loaded onto the first vehicle 100 from behind, via the plurality of track portions (110, 120).

It should be appreciated that the first embodiment of the present invention is not limited to the door/ramp/track configuration shown in FIGS. 2A and B. For example, the door 30 may swing upward, downward (e.g., function as both a door and a ramp, etc.), or to the side, and may do so manually or automatically (e.g., via a motor that is controlled by a button on the first vehicle, second vehicle, remote electronic device (e.g., FOB, smartphone, etc.), etc. The ramp 40 may also be moved manually or automatically (e.g., via a motor that is controlled by the same button that controls the door, via a second, dedicated button, etc.). Moreover, if the ramp is motorized, its capability can be much greater than just moving between a first position (shown in FIG. 2A) and a second position (shown in FIG. 2B). For example, the ramp 40 could be laid flat on the ground, allowing the second vehicle to be more easily loaded onto the second track portion 120. The ramp 40 could also be moved to an upper, horizontal position outside the van, coplanar with the floor (or lower horizontal surface) of the van (aligning the two track portions). This would allow the second vehicle to be more easily moved from the second track portion 120 to the first track portion 110. The ramp 40 could further be moved inside the van, and lowered onto the floor (or lower horizontal surface), thereby completely automating the loading process. It should also be appreciated that the first embodiment of the present invention is not limited to the orientation of the second, detachable vehicle, as shown in FIG. 2A (i.e., with the rear-wheel going in first). For example, loading the second, detachable vehicle front-wheel first is not only within the spirit and scope of the present invention, but allows for other features, such as the docking station (discussed below), to be more easily implemented.

Figure 3A:
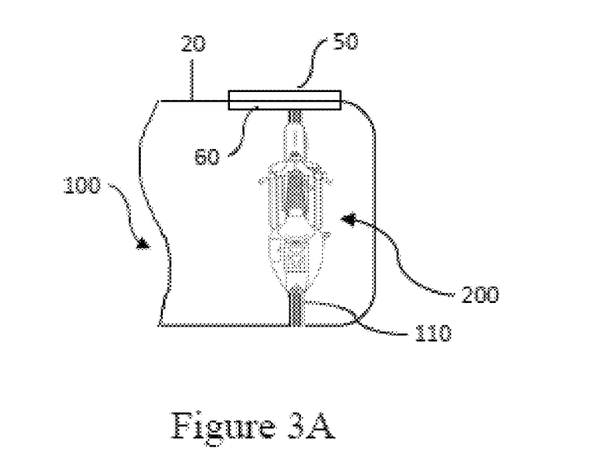
FIGS. 3A and B illustrate how the larger vehicle can be configured to receive, secure, and/or transport a smaller, detachable vehicle in accordance with a second embodiment of the present invention.
Figure 3B:
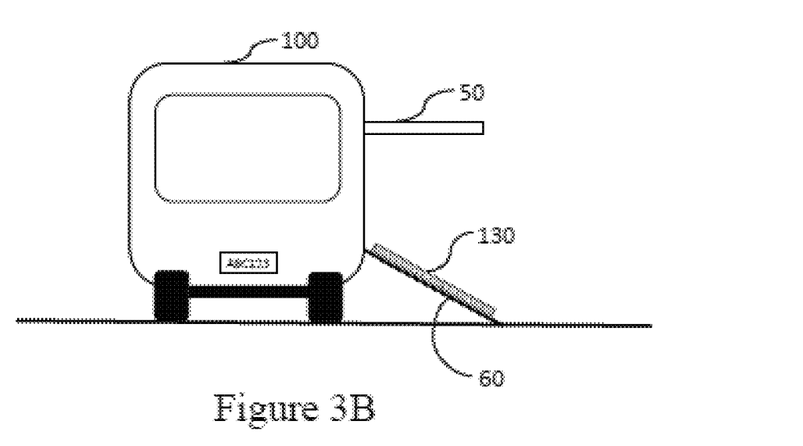

In the second embodiment of the present invention, as shown in FIGS. 3A and B, the first vehicle 100 includes at least one door 50 and at least one ramp 60, and the track includes a first track portion 110 that is mounted to a floor (or lower horizontal surface) of the first vehicle and a third track portion 130 that is mounted to the ramp 60. This allows the second vehicle 200 to be loaded onto the first vehicle 100 from the side, via the plurality of track portions (110, 130).

It should be appreciated that the second embodiment of the present invention (as with the first) is not limited to the door/ramp/track configuration shown in FIGS. 3A and B. For example, the door 50 may swing upward, downward (e.g., function as both a door and a ramp, etc.), or to the side, and may do so manually or automatically. The ramp 60 may also be moved manually or automatically, and, as discussed above, may be laid flat on the ground, moved to an upper, horizontal position outside the van, coplanar with the floor (or horizontal surface) of the van (aligning the two track portions), and/or moved inside the van.

With respect to both the foregoing embodiments (i.e., shown in FIGS. 2A, 2B, 3A, 3B), it should be appreciated that if the loading/unloading process is completely automated (as discussed above), then the pressing of a single button on the first vehicle, a FOB, or a mobile device (e.g., smartphone), may result in the first vehicle's loading/unloading system (e.g., ramp, door, etc.) being moved from a retracted position to an extended position, resulting in the second vehicle being unloaded from the first vehicle. This operation may be completed in a matter of seconds (like opening a convertible top on a vehicle) and may require the use of at least one external sensor (e.g., to ensure that the loading/unloading system can be safely extended, and the second vehicle safely unloaded, without hitting another vehicle, a curb, etc.). Once the second vehicle has been moved (e.g., driven) off the ramp, the pressing of a single button on the second vehicle, a FOB, or a mobile device, may return the loading/unloading system to its retracted position. Again, this operation may be completed in a matter of seconds (like closing a convertible top on a vehicle) and may require the use of at least one internal sensor (e.g., to ensure that the loading/unloading system can be safely retracted without hitting an object, an individual, etc.).

Using the same (or different) button(s), the second vehicle can be automatically loaded onto the first vehicle. For example, pressing a button on the second vehicle, a FOB, or a mobile device, may result in the loading/unloading system being moved from its retracted position to its extended position, allowing the second vehicle to be moved (e.g., driven) onto the ramp. Then, pressing a button on the first vehicle, a FOB, or a mobile device, may return the loading/unloading system to its retracted position, resulting in the second vehicle being loaded onto the first vehicle. While the present invention is not limited to a loading/unloading process that is automated, such features are considered to be within the spirit and scope of the present invention.

Figure 4:
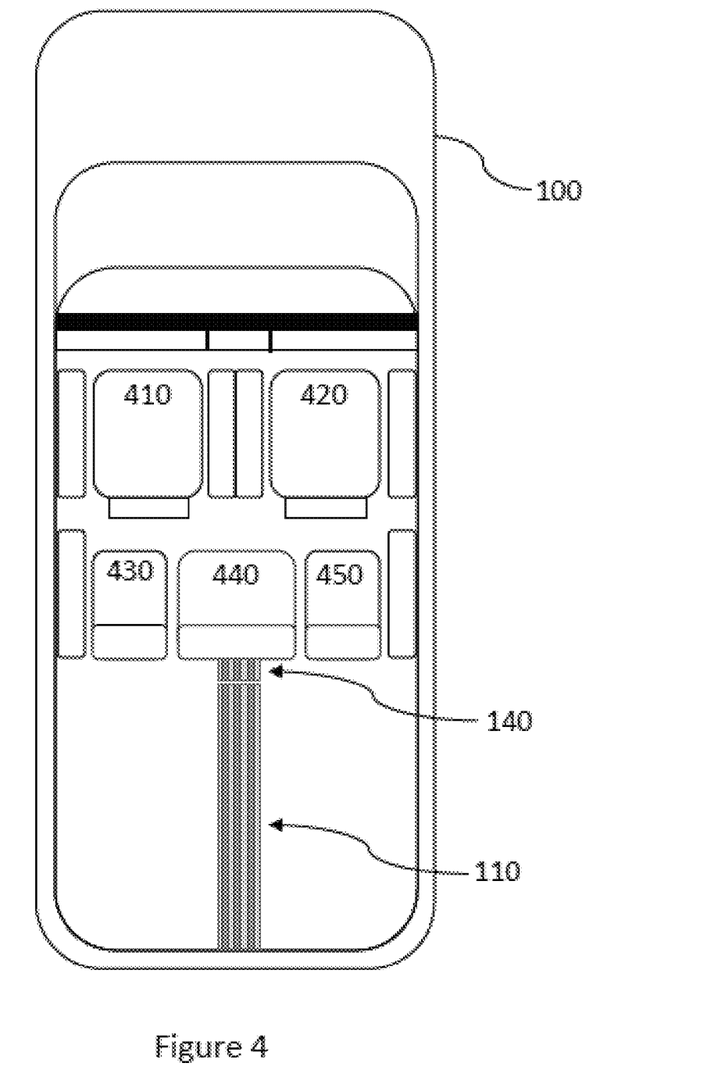
FIG. 4 illustrates how a plurality of tracks can be mounted within the larger vehicle and used to transport and/or secure a smaller, detachable vehicle in accordance with another embodiment of the present invention.
Figure 5A:
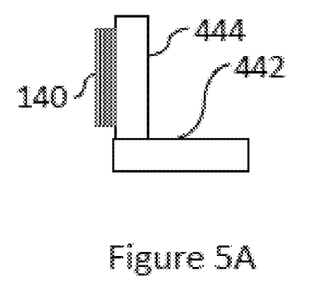
FIGS. 5A and B provide a side view of one of the tracks depicted in FIG. 4, as attached to a backside of a seat within the larger vehicle.
Figure 5B:
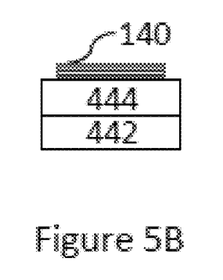

If the first vehicle is a cargo van or a truck, then a single track portion inside the first vehicle may suffice. However, if the first vehicle is a passenger van or car, with additional seating, then additional track portions may be required in order to place the second vehicle completely inside the first vehicle. By way of example, as shown in FIG. 4, the first vehicle 100 may include a first track portion 110 mounted to a floor (or lower horizontal surface) of the first vehicle and a fourth track portion 140 mounted to a back of a seat 440, where the seat 440 is movable (manually, automatically) from a first position (as shown in FIG. 5A) to a second position (as shown in FIG. 5B). In other words, as shown in FIGS. 5A and B, the seat 440 may include a horizontal portion 442 (supporting a person from below) and a vertical portion 444 (supporting a person from behind), where the fourth track portion 140 is mounted to a back of the vertical portion 444. The horizontal and vertical portions (442, 444) may further be pivotally connected, allowing the vertical portion 444 to rotate downward (manually or automatically), thereby aligning the first and fourth track portions (110, 140) (e.g., making them substantially coplanar).

It should be appreciated that the location of the fourth track portion 140 (e.g., on a back of seat 430, 440, 450, etc.) is dependent on where the first track portion 110 is location inside the first vehicle 100. For example, if the first track portion 110 is moved to the right, then the fourth track portion 140 may be mounted to a back of seat 450. Similarly, if the first track portion 110 is moved to the left, then the fourth track portion 140 may be mounted to a back of seat 430. It should also be appreciated that if multiple rows of seating are available inside the first vehicle 100, additional track portions can be used to move the second vehicle 200 further toward the front of the first vehicle 100. For example, by moving the first track portion 110 to the right, and mounting the fourth track portion 140 to the back of seat 450, a fifth track portion (not shown) can be mounted to the back of seat 420 in order to move the second vehicle 200 further toward the front of the first vehicle 100.

If the second vehicle (or a portion thereof) is encroaching on space where passengers may be seated, then additional structure (e.g., a partial enclosure, etc.) may be necessary to prevent the passengers from coming into contact with the second vehicle, or to protect the passengers from the second vehicle (e.g., keep them from getting injured, keep them from getting dirty, etc.). Such an embodiment is shown in FIGS. 5C-F, where a shell (or hood) 446 is further attached to the back of vertical portion 444 (or back of seat 440). The shell 446 is configured to at least shield a passenger seated on seat 430 and a passenger seated on seat 450 from at least a portion (e.g., front tire, etc.) of the second vehicle 200. As shown in FIG. 5E, the shell 446 may include a first vertical side 446A (between the front tire 210 and seat 430), a second vertical side 446B (between the front tire 210 and seat 450), a third vertical side 446C (between the front tire 210 and seats 410, 420), a top 446D, and an aperture 446E (allowing the front tire 210 to enter the shell 446 via the fourth track portion 140).

Figure 5C:
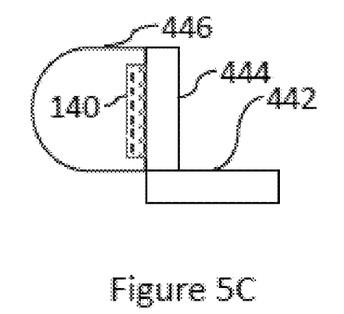
FIGS. 5C and D illustrate how a partial enclosure (e.g., shell, hood, etc.) can be used to prevent passengers of the larger vehicle from coming into contact with a portion of the smaller vehicle while the smaller, detachable vehicle is being transported.
Figure 5D:
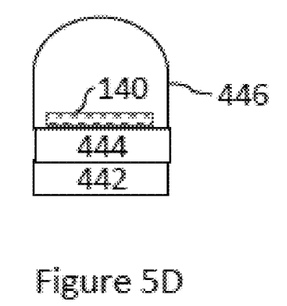
Figure 5E:
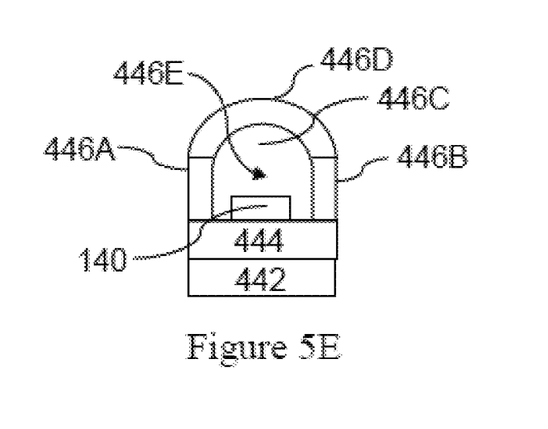
FIGS. 5E and F illustrate how the partial enclosure depicted in FIGS. 5C and 5D can be used to prevent passengers of the larger vehicle from coming into contact with at least one tire of the smaller, detachable vehicle.
Figure 5F:
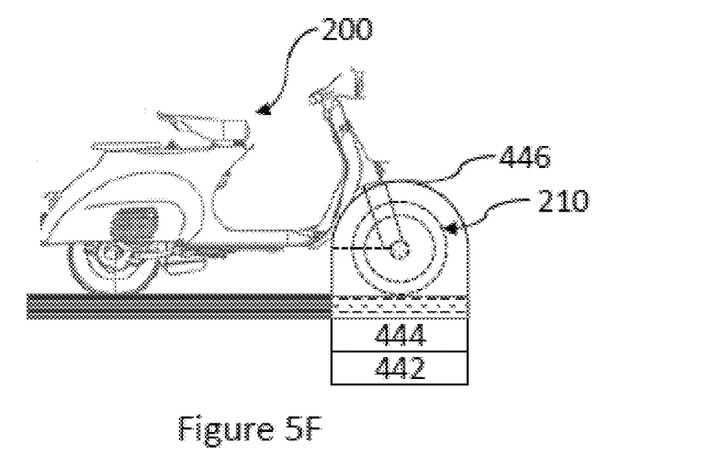

It should be appreciated that the present invention does not require such a structure, and to the extent that one is used, is not limited to the structure shown in FIGS. 5C-E. Thus, one or more structures having any shape or size, and configured to enclose any portion of the second vehicle is within the spirit and scope of the present invention. It should also be appreciated that if the structure is configured appropriately (e.g., a size that is substantially the shape of the portion being enclosed, etc.), the structure can further function (e.g., along with the track) to support the second vehicle for transport (e.g., similar to how a bicycle rack maintains a bicycle upright).

Figure 6:
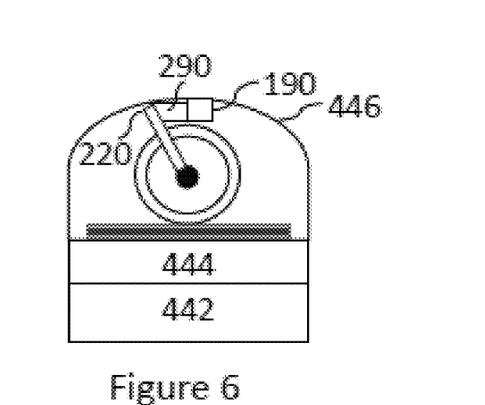
FIG. 6 illustrates how the partial enclosure can further be used as a docking station for the smaller, detachable vehicle, allowing the exchange of information and/or power between the larger/smaller vehicle.

As shown in FIG. 6, the enclosure may include a first connector 190, and the second vehicle may include a second connector 290, where the connectors 190, 290 are configured to mate with one another. Pins and sockets (or other conductive materials) included within the connectors 190, 290 (not shown) can be used to transfer power and/or information (e.g., commands, data, etc.) between the first and second vehicles. And if the first and second connectors 190, 290 are positioned to mate upon movement of the second vehicle (or portion thereof) into the enclosure 446, then the enclosure 446 can be thought of as a "docking station" for the second vehicle (similar to a cradle for a cordless telephone, providing both support and at least one electrical connection). Once an electrical connection is made, the connection can be used to share information and/or to charge a battery on the second vehicle, both of which are discussed in greater detail below.

It should be appreciated that the present invention is not limited to the first and second connectors being positioned as shown in FIG. 6, and mounting the first and second connectors anywhere (e.g., mounting the first connector inside the enclosure, mounting the first connector outside the enclosure, mounting the first connector on the ramp, mounting the second connector anywhere on the second vehicle, mounting both connectors to automatically mate when the second vehicle is moved from a first location to a second location, mounting both connectors to be mated manually, etc.) is within the spirit and scope of the present invention.

Figure 7:
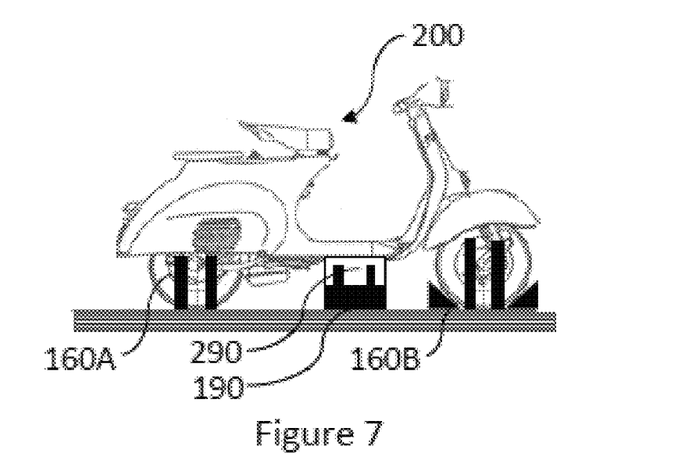
FIG. 7 illustrates an alternate docking station for the smaller, detachable vehicle, along with a securing means in accordance with one embodiment of the present invention.
Figure 8A:
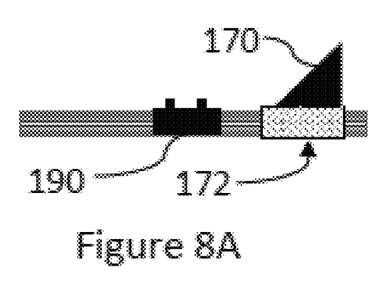
FIGS. 8A, B and C illustrates exemplary switches that could be used to dock the smaller, detachable vehicle (i.e., engage the connector, as depicted in FIG. 7) in accordance with embodiments of the present invention.
Figure 8B:
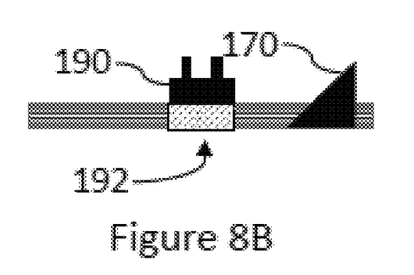
Figure 8C:
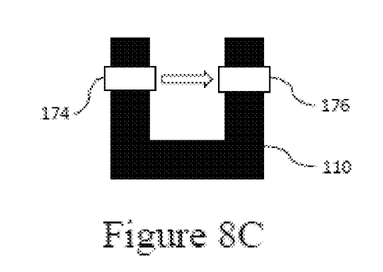

For example, as shown in FIG. 7, the first connector 190 may be affixed to the track, and the second connector 290 affixed to a bottom (undercarriage) of the second vehicle 200. In this embodiment, the first connector 190 can be configured to mate with the second connector 190 either manually or automatically. For example, as shown in FIGS. 8A and B, the first connector 190 can be positioned within a recess 192. When the second vehicle (or tire thereof) comes into contact with structure 170, downward movement of the structure (e.g., into recess 172), may "trigger" operation of a motor (not shown) to lift the first connector 190, thereby mating the first connector 190 with the second connector 290. In an alternate embodiment, as shown in FIG. 8C, an electrical sensor 174, 176 can be used to "trigger" operation of the motor (not shown). Such sensors may include, for example, a light (e.g., IR) source 174 and a light detector 176. When the second vehicle (or tire thereof) block the light from the detector 176, operation of the motor (not shown) is "triggered." It should be appreciated that connector locations and methods of mating the same, as depicted and described herein, are merely examples, and are not limitations of the present invention.

Referring back to FIG. 7, the track may also include other structures that secure the second vehicle, or prevent the vehicle from moving along the track. For example, first vertical structures (e.g., 160A) (e.g., "forks") can be positioned to engage the axles of the second vehicle 200. In addition, or alternatively, second vertical structures (e.g., 160B) (e.g., "wedges") can be placed in front of and/or behind the tires. Such structures (which can be manually or automatically placed) are configured to prevent (or at least limit) vehicle movement along the track. While the present invention is not limited to any particular type and/or number of support structures, by using some (or all) of the structures disclosed herein, the second vehicle can be secured in place during transport. By way of example only, the track may prevent the vehicle from moving side to side, the vertical structures may prevent the vehicle from moving front to back, and the enclosure may keep the vehicle upright (e.g., vertical).

Figure 9A:
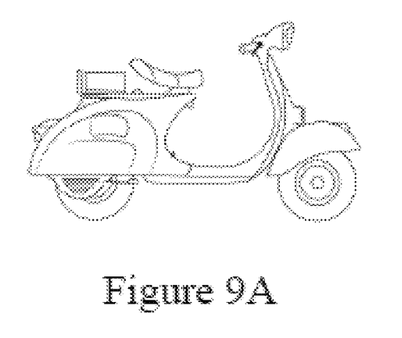
FIGS. 9A and B depict exemplary smaller, detachable vehicles that are within the spirit and scope of the present invention.
Figure 9B:
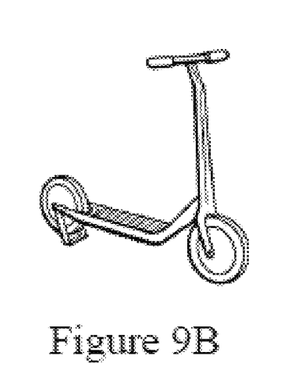

While the present invention is particularly useful in transporting a motorized scooter, as shown in FIG. 9A, it is equally applicable to non-motorized scooters, such as the type shown in FIG. 9B. Key limitations will be the size of the first vehicle and the size of the second vehicle. In order to increase the present invention's range of use, it may be necessary to reduce the footprint of the second vehicle. This can be done by modifying the second vehicle, allowing it to be folded or rearranged.

Figure 10A:
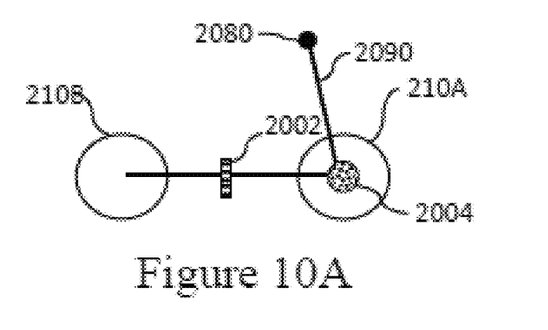
FIGS. 10A-C, 11, and 12 provide examples of how the smaller, detachable vehicle can be folded or arranged to more easily fit within the larger vehicle.
Figure 10B:
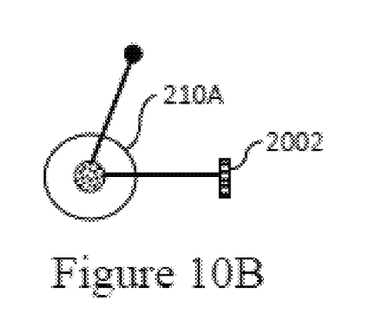
Figure 10C:
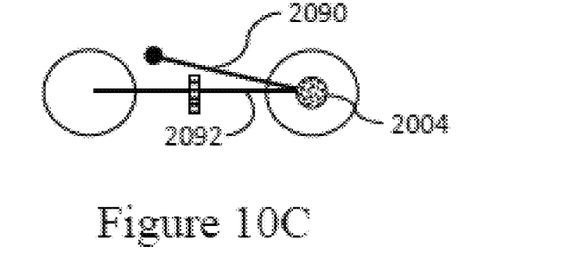

By way of example, as shown in FIGS. 10A and B, a first hinge 2002 (e.g., within the frame 2092, etc.) can be used to fold the vehicle in half, resulting in the front wheel 210A being positioned over (or near) the rear wheel 210B. Further, as shown in FIG. 10C, a second hinge (or pivot) 2004 (e.g., between the stem 2090 and the front wheel 210A, etc.) can be used to pivot the stem 2090 downward, toward the frame 2092. Those skilled in the art will understand that use of the first hinge 2002 will reduce the overall length of the vehicle, while use of the second hinge 2004 will reduce the overall height of the vehicle. It should be appreciated that both hinges can be locked, allowing the vehicle to function properly during operation, and unlocked, allowing the vehicle's size to be reduced during transport.

Figure 11:
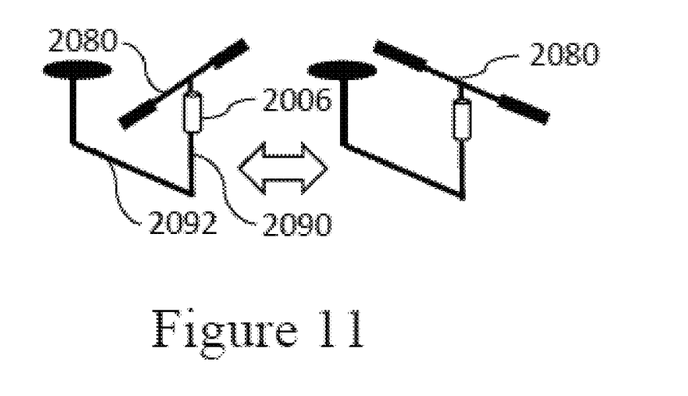
Figure 12:
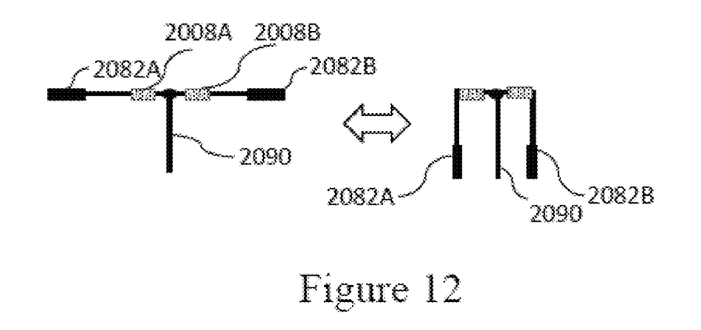

By way of another example, as shown in FIG. 11, a pivot 2006 (e.g., between the handlebars 2080 and the stem 2090, etc.) can be used to swivel the handlebars 2080 from a first position (i.e., perpendicular to the frame 2092) to a second position (e.g., parallel to the frame 2092, not-perpendicular to the frame 2092, etc.). Further, as shown in FIG. 12, third and fourth hinges 2008A, 2008B (e.g., within the handlebars 2080, etc.) can be used to fold the grips 2082A, 2082B inward. Those skilled in the art will understand that the pivot 2006 and the third and fourth hinges 2008A, 2008B will reduce the overall width of the vehicle. Again, it should be appreciated that the pivot and hinges can be locked, allowing the vehicle to function properly during operation, and unlocked, allowing the vehicle's size to be reduced during transport. It should also be appreciated that FIGS. 10-12 are merely examples, and are not limitations of the present invention.

Figure 13:
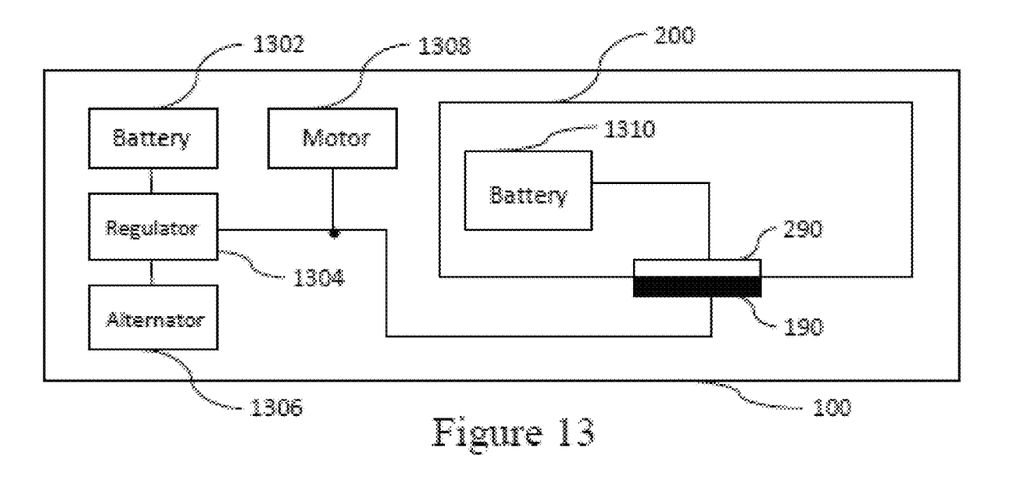
FIG. 13 illustrates a block diagram of components that may be used to provide power from the larger vehicle to the smaller, detachable vehicle (e.g., charge the smaller vehicle, etc.) in accordance with one embodiment of the present invention.

As discussed above, by forming an electrical connection between the first and second vehicle, power and/or information (e.g., commands, data, etc.) can be transferred therebetween. For example, if the first vehicle has at least one battery and/or at least one charging mechanism (e.g., an alternator), these features can be used to charge a battery on the second vehicle (e.g., while the second vehicle is being transported). In other words, not only is the first vehicle being used to transport the second vehicle, but it is also being used to charge the second vehicle. FIG. 13 provides a block diagram of components that may be used in performing this aspect of the present invention.

In particular, first and second connectors 190, 290 may be used to electrically connect the first and second vehicles 100, 200. The connectors may be used to transmit power from the first vehicle 100 to the second vehicle 200. Specifically, the first vehicle may include at least one battery 1302 and/or at least one alternator 1306. These power devices may be used to power various features on the first vehicle, including, but not limited to, at least one motor 1308, which may be used to move (or operate) at least one door, at least one ramp, at least one support structure, at least one seat, at least one connector, etc. As with traditional vehicles, the battery 1302 may be used to power features when the first vehicle's motor is not running, and the alternator 1306 may be used to power features when the first vehicle's motor is running.

The first vehicle may also include a regulator 1304, which functions to control the power that is provided to the second vehicle, or a battery 1310 included therein. The regulator 1304 may control whether or not power is to be provided to the battery 1304, and if so, the amount of power (e.g., voltage, current, etc.) that is to be provided. It should be appreciated that FIG. 13 is a simplified block diagram, and as such does not show components that are commonly included on vehicles that are gasoline and/or battery powered and are generally known to those skilled in the art. It should further be appreciated that the present invention is not limited to the block diagram shown in FIG. 13, and may include additional, fewer, or different components.

Figure 14:
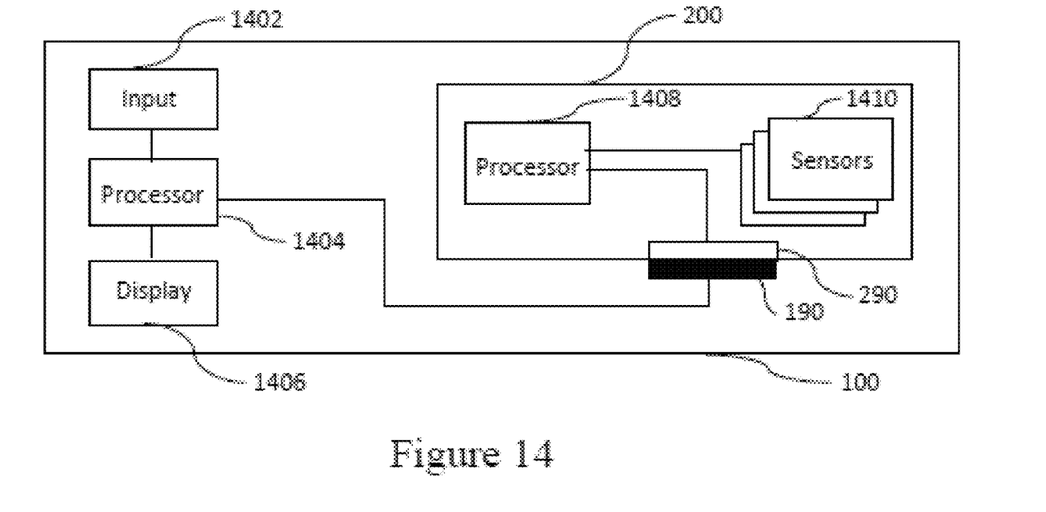
FIG. 14 illustrates a block diagram of components that may be used to exchange information between the larger vehicle and the smaller, detachable vehicle in accordance with one embodiment of the present invention.
Figure 15:
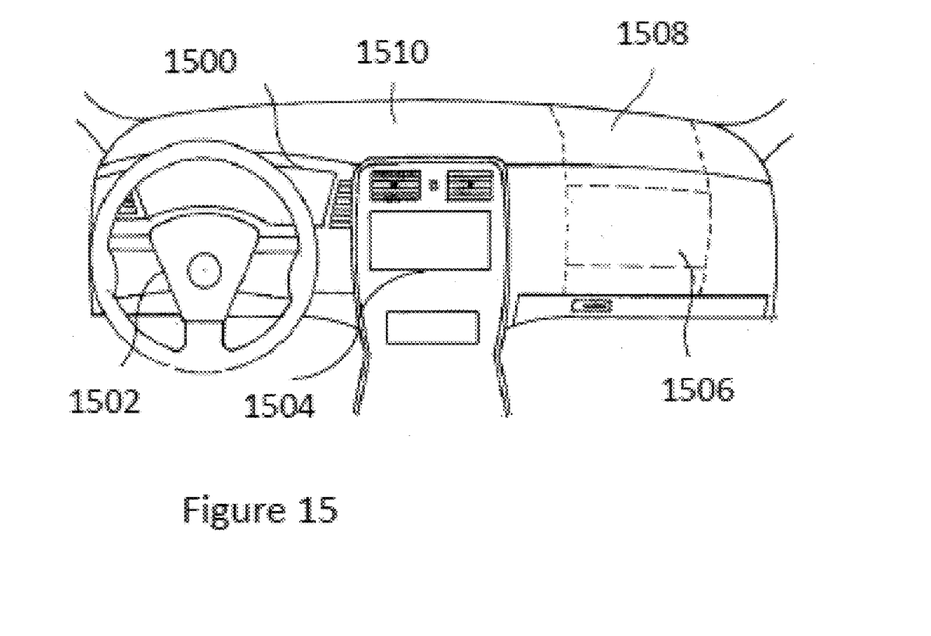
FIG. 15 illustrates how at least one display within the larger vehicle can be used to provide information (e.g., concerning the smaller, detachable vehicle, etc.) to the driver of the larger vehicle.

FIG. 14 provides a second block diagram, which includes components that may be used to exchange information between the two vehicles. Specifically, the first vehicle 100 may include an input 1402 (e.g., keyboard, touch screen, knobs, buttons, etc.), a processor 1404 and a display 1406 (e.g., LCD, etc.). As shown in FIG. 15, the display may be incorporated into the vehicle's primary display 1500, added to the steering wheel 1502, make up the vehicle's secondary display 1504, or added to areas of the dashboard 1506, 1508, 1510. The second vehicle 200 may include a processor 1408 and at least one sensor 1410.

The processor in the second vehicle (1408) can use the electrical connection between the vehicles (made via connectors 190, 290) to transmit information sensed by the sensors 1410 to the first vehicle 100. This can includes diagnosis data, such as tire pressure, battery level (e.g., charge percentage, miles to empty, etc.), status of each light (e.g., headlight, brake light, turning signals, etc.), etc. The diagnosis data can then be displayed to the user (i.e., via the display 1406) and/or acted on by the processor 1404 (e.g., stop charging the second vehicle if the battery is fully charged, etc.).

The processor in the first vehicle (1404) can also use the electrical connection between the vehicles to provide information to the second vehicle 200, such as music, maps, driving directions, etc. It should be appreciated that FIG. 14 is a simplified block diagram, and as such does not show vehicles components that are generally known to exist by those skilled in the art. It should further be appreciated that the present invention is not limited to the block diagram shown in FIG. 14, and may include additional, fewer, or different components.

Finally, while the electrical connection between the vehicles may allow for the exchange of power and/or information, wireless transmitters, receivers, and transceivers can be incorporated into the first and second vehicles, allowing these vehicles to communicate with one another when they are not electrically connected, and/or with other electronic devices.

Figure 16:
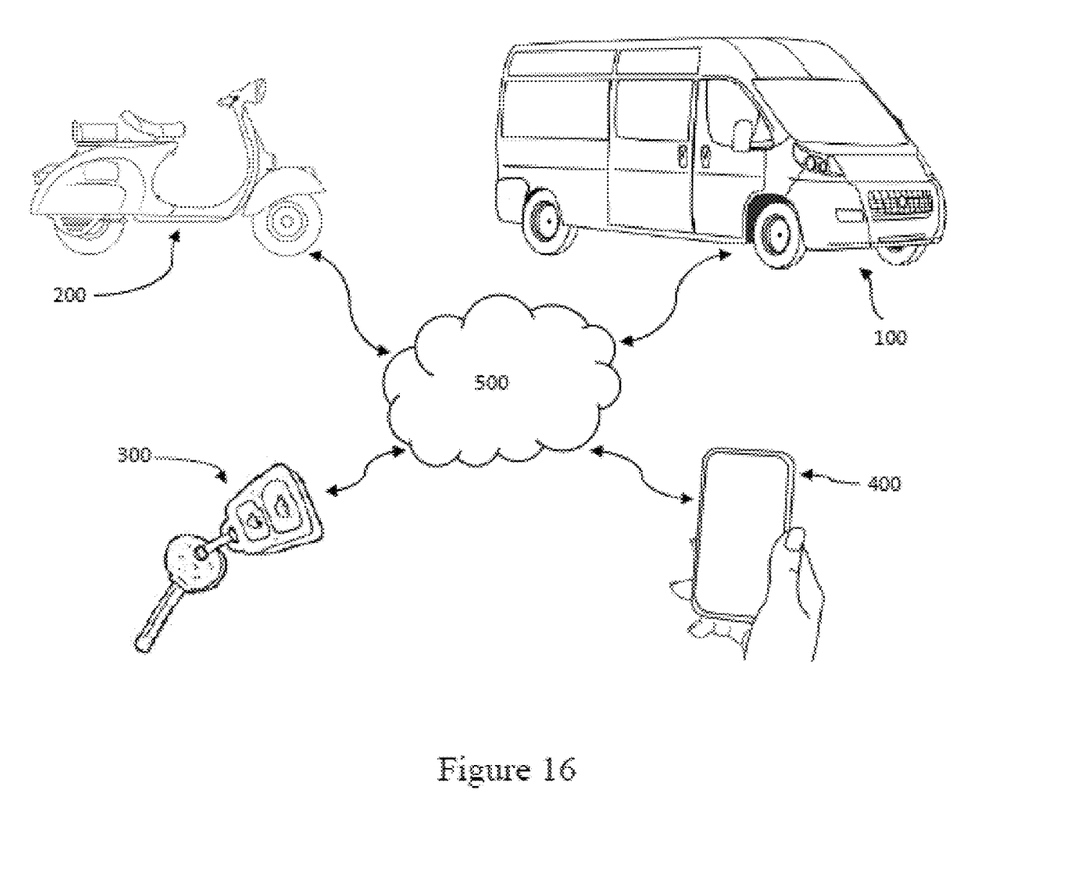
FIG. 16 illustrates that the larger vehicle, the smaller, detachable vehicle, a portable electronic device (e.g., a smartphone, etc.), and/or a FOB may all communicate with one another, or with individual ones, through at least one wireless communication channel (e.g., WiFi, Bluetooth, NFC, RF, IR, etc.).

For example, as shown in FIG. 16, a key FOB 300 may be configured to communicate with the first vehicle 100 via a wireless communication channel 500 (e.g., WiFi, Bluetooth, RF, IR, NFC, etc.), allowing the key FOB 300 to instruct the first vehicle 100 to open/close a particular door and/or move a ramp (e.g., for loading/unloading the second vehicle). A smartphone 400 may also be configured to communicate with the vehicles via the wireless communication channel 500 (or a separate communication channel), allowing similar features to be controlled, and allowing other information to be received from the vehicles and displayed to the user (e.g., the location of the first vehicle, the location of the second vehicle, diagnosis data from the second vehicle, etc.). In other words, the first and/or second vehicles may be configured to transmit tracking data to one another and/or the smartphone (or other computer or tablet), allowing the first and/or second vehicle to be tracked.

Having thus described several embodiments of a system and method for transporting a motorized vehicle, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. A vehicle for transporting a motorized scooter, said vehicle being used to at least charge said motorized scooter while said vehicle is being operated, said vehicle comprising:
    at least one power source for powering at least one feature of said vehicle;
    a track having an inner channel, said inner channel having a width that is substantially same as a width of at least one tire on said motorized scooter, said track being used to guide said motorized scooter at least partially from a first location to a second location within said vehicle; and
    a first connector electrically connected to said at least one power source, said first connector being used to provide power to said motorized scooter at least when said motorized scooter is being transported and said motorized scooter is at said second location;
    wherein said first connector is configured to automatically mate with a second connector on said motorized scooter in response to moving said motorized scooter along said track from said first location to said second location, said second connector being electrically connected to at least one battery on said motorized scooter.

2. The vehicle of claim 1, wherein said track runs from a back of said vehicle toward a front of said vehicle.

3. The vehicle of claim 2, further comprising at least one seat, said at least one seat being movable from a first position to a second position and comprising a second track that is aligned with said track at least when said seat is in said second position.

4. The vehicle of claim 3, wherein said at least one seat further comprises a shell, wherein movement of said motorized scooter over said second track results in said shell covering at least a portion of said motorized scooter.

5. The vehicle of claim 1, wherein said track runs from a first side of said vehicle toward a second side of said vehicle.

6. The vehicle of claim 1, further comprising a ramp for moving said motorized scooter onto said vehicle, said ramp being movable from at least a first position to a second position and comprising a second track that is aligned with said track at least when said ramp is in said second position.

7. The vehicle of claim 6, further comprising a motor for moving said ramp from said first position to said second position.

8. The vehicle of claim 1, further comprising at least one structure for securing said motorized scooter at said second location.

9. The vehicle of claim 1, wherein said at least one power source is at least one of a battery and an alternator.

10. The vehicle of claim 1, further comprising a display for displaying information related to said motorized scooter, said information being communicated from said motorized scooter to said vehicle via at least said first connector and said second connector.

11. A method for using a vehicle to transport a motorized scooter, said vehicle being used to at least charge said motorized scooter while said vehicle is being operated, said method comprising:
    moving said motorized scooter along at least one track within said vehicle from a first location to a second location, said at least one track having an inner channel having a width that is substantially same as a width of at least one tire on said motorized scooter;
    automatically mating a first connector on said vehicle with a second connector on said motorized scooter in response to moving said motorized scooter along said at least one track from said first location to said second location; and
    providing power to said motorized scooter at least when said vehicle is being operated, said power being provided from at least one power source of said vehicle to at least one battery on said motorized scooter via said first connector and said second connector.

12. The method of claim 11, further comprising a step of moving a ramp from at least a first position to a second position, wherein said at least one track includes a first portion that is affixed to a horizontal surface of said vehicle and a second portion that is affixed to said ramp, said second portion being aligned with said first portion at least when said ramp is moved into said second position.

13. The method of claim 12, further comprising operating a motor to move said ramp from said first position to said second position.

14. The method of claim 11, further comprising a step of moving a seat from a first position to a second position, wherein said at least one track includes a first portion that is affixed to a horizontal surface of said vehicle and a second portion that is affixed to a back of said seat, said second portion being aligned with said first portion at least when said seat is moved into said second position.

15. The method of claim 14, wherein the step of moving said motorized scooter along said at least one track within said vehicle from said first location to said second location further comprises moving at least a portion of said motorized scooter inside a shell affixed to a back of said seat, thereby protecting a passenger of said vehicle from said portion of said motorized scooter.

16. The method of claim 11, further comprising a step of securing said motorized scooter at said second location.

17. The method of claim 11, wherein said step of providing said power to said motorized scooter at least when said vehicle is being operated comprises providing power from at least one other battery and an alternator to said at least one battery on said motorized scooter, said at least one other battery and said alternator being located on said vehicle.

18. The method of claim 11, further comprising displaying information related to said motorized scooter, said information being communicated from said motorized scooter to said vehicle via said first connector and said second connector.

19. A vehicle for transporting a motorized scooter, said vehicle being used to at least charge said motorized scooter while said vehicle is being operated, said vehicle comprising:
 a power source for powering at least one motor on said vehicle;
 a first track affixed to a horizontal surface of said vehicle, said first track having an inner channel having a width that is slightly larger than a width of at least one tire on said motorized scooter;
 a ramp movable from at least a first position to a second position, said ramp including a second track aligned with said first track at least when said ramp is in said second position, said at least one motor being used to move said ramp from said first position to said second position;
 a seat movable from at least a third position to a fourth position, said seat including a third track aligned with said first track at least when said seat is in said fourth position; and
 a first connector electrically connected to said power source, said first connector being used to provide power to said motorized scooter at least when said vehicle is being operated;
 wherein said first track, said second track, and said third track are used to guide said motorized scooter from a first location to a second location within said vehicle, and said first connector is automatically mated with a second connector on said motorized scooter in response to moving said motorized scooter to said second location, said second connector being electrically connected to a battery on said motorized scooter.

20. The vehicle of claim 19, wherein said seat further comprises an enclosure that encloses at least a portion of said motorized scooter when said motorized scooter is in said second location, said first connector being connected to said enclosure.

\* \* \* \* \*